(12) United States Patent
Candee et al.

(10) Patent No.: US 6,799,172 B2
(45) Date of Patent: Sep. 28, 2004

(54) METHOD AND SYSTEM FOR REMOVAL OF RESOURCE MANAGER AFFINITY DURING RESTART IN A TRANSACTION PROCESSING SYSTEM

(75) Inventors: Juliet C. Candee, Danbury, CT (US); Steven J. Greenspan, Hyde Park, NY (US); Ricky L. Kready, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 09/941,276

(22) Filed: Aug. 28, 2001

(65) Prior Publication Data

US 2003/0046258 A1 Mar. 6, 2003

(51) Int. Cl.[7] ............................................... G06F 17/30
(52) U.S. Cl. .............................. 707/1; 707/8; 707/10; 707/201; 707/203; 709/106; 709/224; 709/227
(58) Field of Search ........................ 707/1, 8, 10, 202, 707/203, 100, 201, 204; 709/101, 104, 106, 201, 224, 227

(56) References Cited

U.S. PATENT DOCUMENTS

| | | | | |
|---|---|---|---|---|
| 4,377,000 A | * | 3/1983 | Staab ............................ | 714/55 |
| 4,945,474 A | * | 7/1990 | Elliott et al. .................... | 714/16 |
| 5,452,430 A | * | 9/1995 | Dievendorff et al. .......... | 714/37 |
| 5,459,871 A |   | 10/1995 | Van Den Berg ............ | 395/650 |
| 5,561,797 A | * | 10/1996 | Gilles et al. ................... | 707/8 |
| 5,566,298 A | * | 10/1996 | Boggs et al. ................. | 714/10 |
| 5,729,733 A | * | 3/1998 | Sharif-Askary ............... | 707/8 |
| 5,768,587 A |   | 6/1998 | Freund et al. .............. | 395/671 |
| 5,835,766 A |   | 11/1998 | Iba et al. ..................... | 395/679 |
| 5,852,732 A |   | 12/1998 | Freund et al. .............. | 395/671 |
| 5,920,875 A |   | 7/1999 | Clark et al. ................. | 707/206 |
| 5,923,833 A | * | 7/1999 | Freund et al. ................. | 714/19 |
| 5,956,735 A |   | 9/1999 | Clark et al. ................. | 707/206 |
| 5,966,708 A |   | 10/1999 | Clark et al. ................. | 707/101 |
| 5,999,935 A |   | 12/1999 | Clark et al. ................. | 707/101 |
| 6,067,454 A | * | 5/2000 | Foti ............................. | 455/433 |
| 6,076,095 A |   | 6/2000 | Clark et al. ................. | 707/202 |
| 6,092,084 A |   | 7/2000 | Clark et al. ................. | 707/202 |
| 6,101,527 A |   | 8/2000 | Lejeune et al. ............. | 709/201 |
| 6,108,667 A |   | 8/2000 | Clark et al. ................. | 707/200 |
| 6,125,393 A |   | 9/2000 | Clark et al. ................. | 709/224 |
| 6,128,710 A |   | 10/2000 | Greenspan et al. ......... | 711/152 |
| 6,157,927 A |   | 12/2000 | Schaefer et al. ............ | 707/103 |
| 6,189,147 B1 | * | 2/2001 | Davis ........................ | 717/175 |
| 6,311,290 B1 | * | 10/2001 | Hasbun et al. ................ | 714/15 |
| 6,480,944 B2 | * | 11/2002 | Bradshaw et al. .......... | 711/162 |
| 6,609,184 B2 | * | 8/2003 | Bradshaw et al. .......... | 711/162 |

OTHER PUBLICATIONS

"Research Disclosure Journal", Jul. 2000, No. 435, Article 435176, pp. 1314–1315.

* cited by examiner

Primary Examiner—Charles Rones
Assistant Examiner—Jacques Veillard
(74) Attorney, Agent, or Firm—Andrew J. Wolnicki, Jr.; Cantor Colburn LLP (57) ABSTRACT

An exemplary embodiment of the present invention is a method for affinity free restart of a resource manager in a multi-system environment. The method begins when a restart request is received from a first resource manager on a first system in the multi-system environment. The first resource manager is associated with an incomplete transaction. Next, a distributed transaction unit of recovery structure is built for the incomplete transaction. Then, the distributed transaction unit of recovery structure is sent to a transaction manager for restart processing. The restart process includes restarting the first resource manager on the first system. The restart process also includes restarting a second resource manager on a second system in the multi-system environment if the incomplete transaction is associated with the second resource manager. The second system is a different system in the multi-system environment than the first system and the second resource manager previously had a node in common with the first resource manager. Additional embodiments include a system and storage medium for affinity free restart of a resource manager in a multi-system environment.

30 Claims, 10 Drawing Sheets

METHOD AND SYSTEM FOR REMOVAL OF RESOURCE MANAGER AFFINITY DURING RESTART IN A TRANSACTION PROCESSING SYSTEM

FIELD OF THE INVENTION

The present invention relates generally to transaction processing systems. More particularly, the present invention relates to removal of resource manager affinity during restart in a transaction processing system.

BACKGROUND OF THE INVENTION

In most transaction processing systems, both distributed and non-distributed, when a transaction begins and a resource manager becomes involved in a transaction, that resource manager is then bound to the transaction manager and its logical network node. In many cases, the binding is even to the actual physical system. When a transaction, the resource manager, the transaction manager, or the system(s) they are running on fail, all of the failed entries must restart honoring their affinities. These affinities can restrict the ability of a computer system to quickly and easily recover from failures. In addition, these affinities can prevent resource managers from performing peer recovery.

The inability to coordinate a transaction across multiple systems within a multi-system environment places a limitation on resource manager restart processing after a transaction manager failure, such that the resource managers involved in a unit of recovery (or a common set of units of recovery) are required to restart on a single system. This complicates the restart configuration and makes it difficult to balance restart processing across systems within their own multi-system environment. For example, an application running on a multi-system environment may include a function that transfers money from a savings account into a checking account. The unit of recovery in this example would include both the withdrawal from the savings account and the deposit into the checking account. The transaction that withdraws money from the savings account may be performed using a Database 2 (DB2®) resource manager, and the transaction that deposits money into the checking account may be performed using an Information Management System (IMS) resource manager. If a restart is required, both the DB2® and IMS resource managers must be restarted on the same system within the multi-system environment. It is this affinity that restricts system restarts after failures by limiting the flexibility of system restarts.

SUMMARY OF THE INVENTION

An exemplary embodiment of the present invention is a method for affinity free restart of a resource manager in a multi-system environment. The method begins when a restart request is received from a first resource manager on a first system in the multi-system environment. The first resource manager is associated with an incomplete transaction. Next, a distributed transaction unit of recovery structure is built for the incomplete transaction. Then, the distributed transaction unit of recovery structure is sent to a transaction manager for restart processing. The restart process includes restarting the first resource manager on the first system. The restart process also includes restarting a second resource manager on a second system in the multi-system environment if the incomplete transaction is associated with the second resource manager. The second system is a different system in the multi-system environment than the first system and the second resource manager previously had a node in common with the first resource manager. Additional embodiments include a system and storage medium for affinity free restart of a resource manager in a multi-system environment.

DETAILED DESCRIPTION OF THE INVENTION

The present invention removes the affinities between a particular transaction manager and the resource managers which are associated with it in the event of a transaction manager or system failure. An exemplary embodiment allows resource managers to restart on a choice of systems within the multi-system environment and to perform peer recovery.

Figure 1:
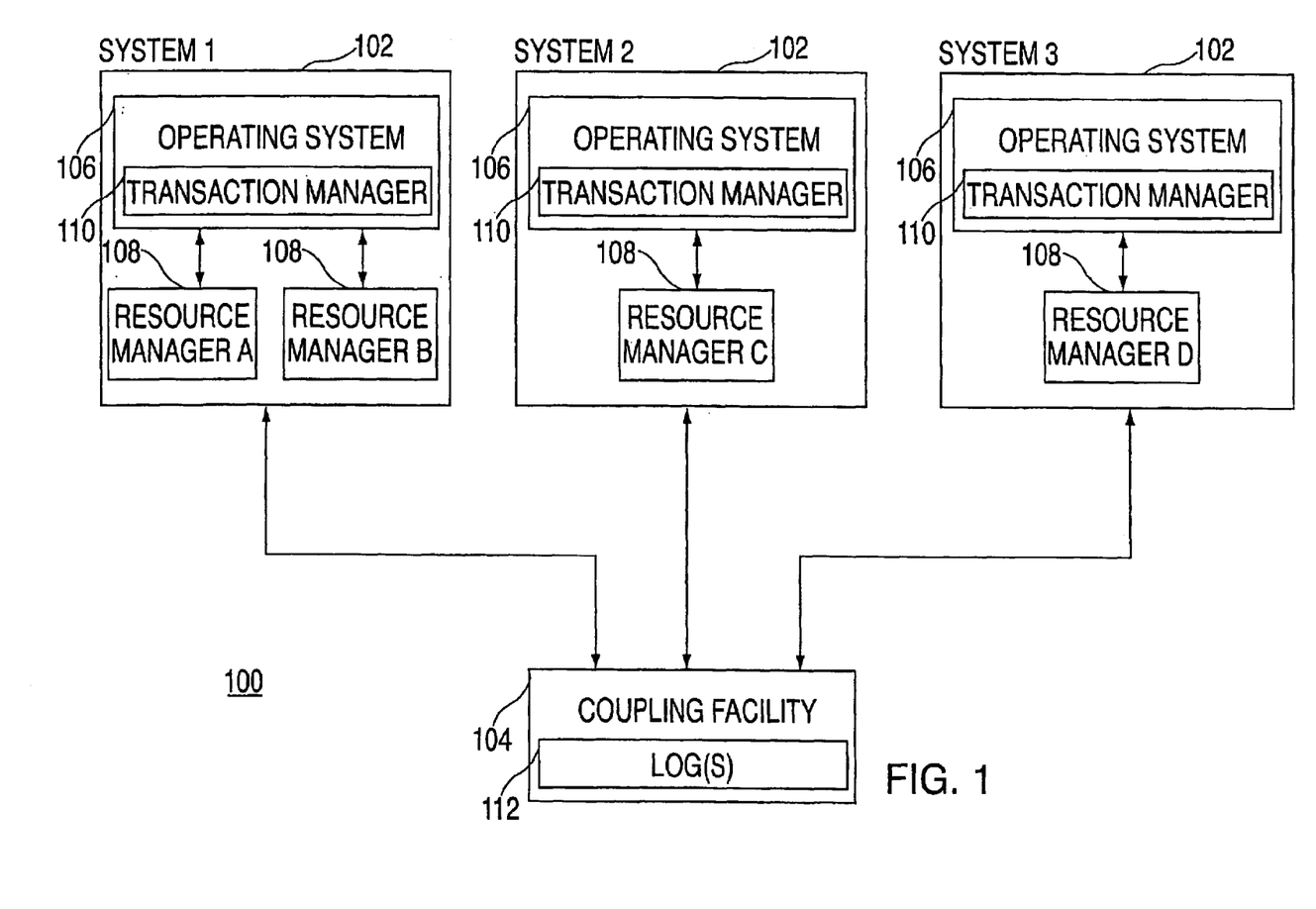
FIG. 1 depicts an exemplary multi-system environment.

An example of a multi-system environment, also referred to as a sysplex, is depicted in FIG. 1. In an exemplary embodiment, the multi-system environment 100 is based on the Enterprise Systems Architecture (ESA/390) offered by International Business Machines Corporation (IBM), and includes one or more systems 102 coupled to a coupling facility 104. Each system 102 includes an operating system 106 and one or more resource managers 108. In an exemplary embodiment, operating system 106 is, for example, the Multi Virtual Storage (MVS) operating system or the OS/390 operating system, both offered by IBM. In an exemplary embodiment, the operating system 106 includes a transaction manager 110, which coordinates participants (such as resource managers) in a two-phase commit protocol. One example of a transaction manager 110, also referred to as a syncpoint manager, is Resource Recovery Service (RRS) which is offered by IBM. In an exemplary embodiment, the transaction manager 110 is coupled to one or more resource managers 108. Each of the resource managers 108 owns and controls a set of resources within the system. As one example, a resource manager is a database management facility, such as IMS or DB2®.

As mentioned above, each system 102 is coupled to coupling facility 104. Coupling facility 104 is a shareable facility that contains storage accessible by the systems 102 and performs operations requested by the resource managers 108 and/or programs running within the systems 102. In one embodiment, coupling facility 104 is a structured-external storage processor (SES). In an exemplary embodiment, the coupling facility 104 includes a plurality of logs 112, also referred to collectively as the common log, which are accessible by one or more of the plurality of systems 102 of the multi-system environment. In one embodiment, at least a portion of one or more of the log streams 112 can be stored in one or more storage devices (e.g., direct access storage devices (DASD)), when, for example, sufficient space for the log streams 112 no longer exist on the coupling facility 104. One example of a log stream 112 in a multi-system environment is described in detail in U.S. patent application Ser. No. 6,076,095 entitled "Method of One System of a Multisystem Environment Taking Over Log Entries Owned by Another System," by Clark et al., issued on Jun. 13, 2000, assigned to International Business Machines Corporation, and hereby incorporated by reference in its entirety.

Figure 2:
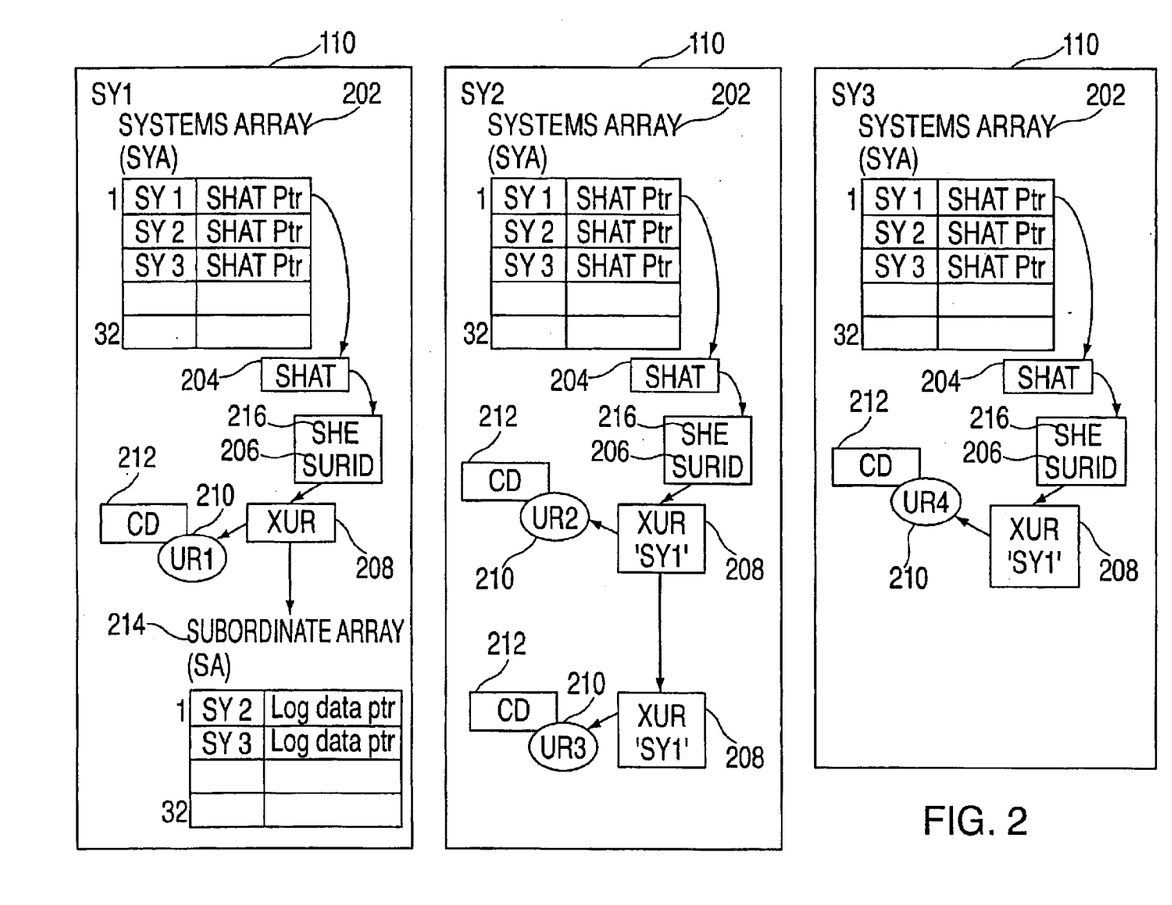
FIG. 2 depicts an exemplary multi-system cascaded unit of recovery family.

An embodiment of the present invention utilizes a multi-system unit of recovery infrastructure to perform restarts that break resource manager affinities. FIG. 2 depicts an exemplary multi-system cascaded unit of recovery family, also referred to as a distributed transaction unit of recovery structure. The control blocks and data depicted in FIG. 2 are stored and controlled within the transaction manager 110 from FIG. 1. A cascaded unit of recovery family is a collection of nodes coordinated by a transaction manager 110 (e.g. RRS) in a cascaded transaction. A cascaded transaction refers to a type of distributed transaction, or part of a distributed transaction, in which the coordination between the systems, or nodes, is directly controlled by the transaction manager 110. In this application, a node refers to a portion of an overall transaction that is locally coordinated by a single transaction manager. FIG. 2 depicts four related units of recovery 210 (UR1, UR2, UR3, UR4) included in a single transaction and therefore all four units of recovery 210 must be committed as a unit or they all must be backed out as a unit. A common sysplex unit of recovery identifier (SURID) 206 ties these four units of recovery 210 together across the systems in the multi-system environment. A sysplex cascade is a cascaded transaction with nodes on more than one system within a sysplex or multi-system environment. The SURID 206 uniquely identifies a sysplex cascade and each SURID 206 is unique within a transaction manager logging group. A logging group is the set of systems using a common set of shared logs. The SURID 206 is persistent and can be used to identify the sysplex cascade across failures.

Referring to FIG. 2, the transaction manager 110, in an exemplary embodiment, contains a systems array 202. The systems array 202 contains a pointer to a SURID hash table (SHAT) 204 for each system in the sysplex, or multi-system environment. In the example depicted in FIG. 2 there are three systems involved in the sysplex cascade: SY1, SY2, and SY3. The SHAT 204 is a hash table kept on each system, used to locate a sysplex hash element (SHE) 216 control block for a particular SURID 206. The SHE 216 is a control block structure that contains a SURID 206 and it points to a queue of sysplex unit of recovery blocks (XURs) 208. The XUR 208 is an additional control block structure that identifies all of the units of recovery 208 on the system that are connected to the same SURID. During the restart process, in an exemplary embodiment, every subordinate resource unit of recovery will have a XUR 208. The context data (CD) 212 control block is used to keep context data about the units of recovery 208 associated with a particular context.

In an exemplary embodiment, as depicted in FIG. 2, each sysplex cascaded unit of recovery family contains a coordinator node and can contain one or more subordinate nodes. The coordinator node is a system 102 upon which the top level unit of recovery of a particular sysplex cascade resides. A top level unit of recovery is the node at the root of the transaction tree. The transaction manager which is managing is responsible for making the overall transaction commit decision. A system 102 can also become the coordinator of a non-sysplex cascade due to restart, if all of the resource managers 108 do not restart on the same system 102. The subordinate nodes are the systems 102 upon which a sysplex cascaded child unit of recovery resides. A child unit of recovery is any node which is not at a top level node. A system 102 can also become a subordinate of what was originally a non-sysplex unit of recovery due to restart, if a resource manager 108 restarts on it when another resource manager 108 involved in the same unit of recovery 210 with the restarting resource manager has already restarted on a different system 102. Referring to FIG. 2, SY1 is the coordinator node while SY2 and SY3 are the subordinate nodes. SY1 contains a subordinate array (SA) 214 which is an array associated with the coordinator node. Each entry in the SA 214 identifies a subordinate system which is part of the sysplex cascade. The SA 214 contains member names (tokens that represent systems within the sysplex) that are passed to the cross-system coupling facility (XCF) when the prepare message is sent. In the example in FIG. 2, the SA 214 points to the log data pointers for SY2 and SY3 because they both contain units of recovery 210 (UR2 and UR3 for SY2; and UR4 for SY3) related to the SURID 206. The log data pointer in the SA 214 is how the coordinator node keeps track of log data for each subordinate node. In an exemplary embodiment there is one SA 214 for each SURID 206 coordinator node.

Referring to FIG. 2, an exemplary embodiment, the coordinator system contains the SHAT 204 that contains the SHE 216 for a sysplex cascaded transaction. For each system in the sysplex, the SHE 216 for a particular SURID 206 can be found by searching the SHAT 204 for the system containing the coordinator. For example, in FIG. 2, SY1 is the coordinator. Therefore, if the transaction manager on SY2 needs to find UR3 210, which is located on SY2, the SURID 206 is used to search the SHAT 204 associated with the system array entry for SY1 (the coordinator).

Figure 6:
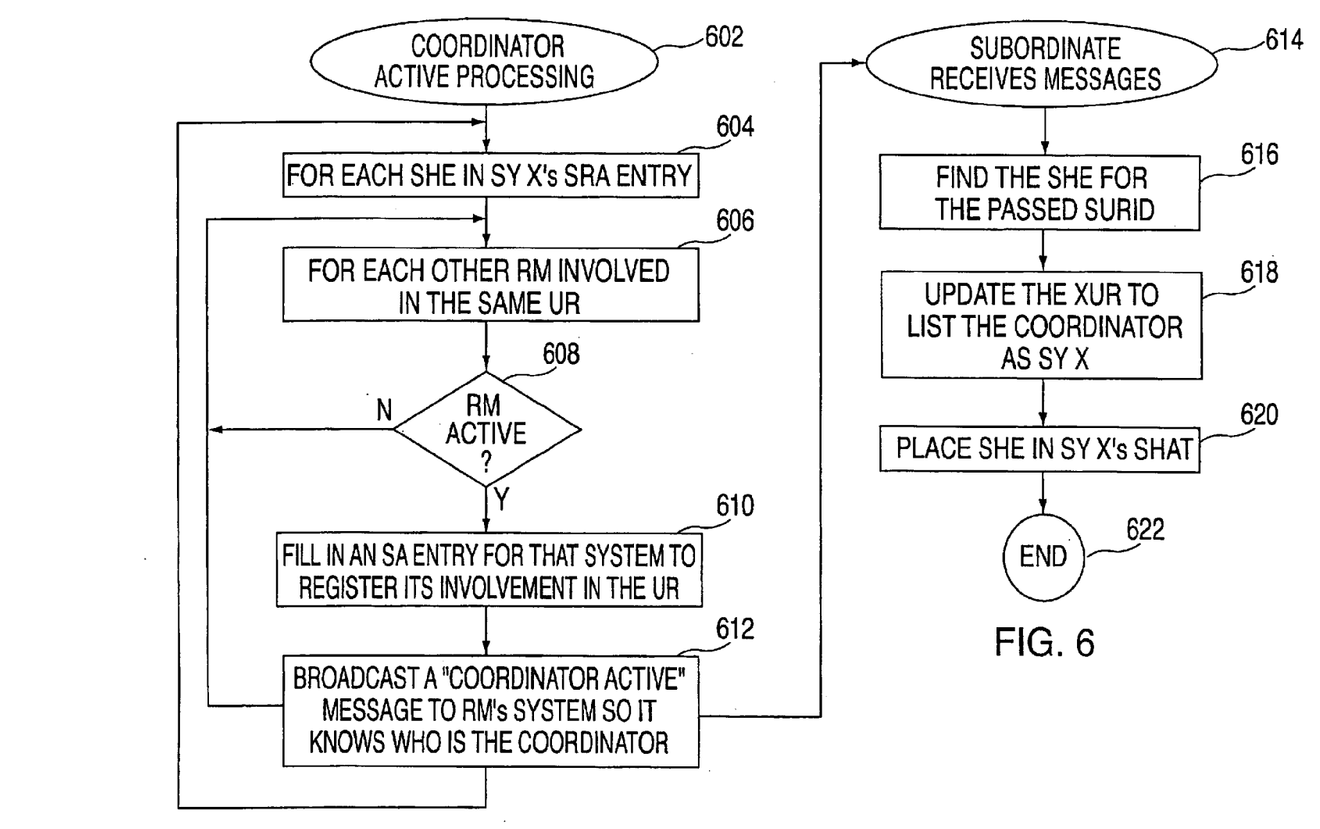
FIG. 6 is a flowchart of an exemplary coordinator active process.
Figure 7:
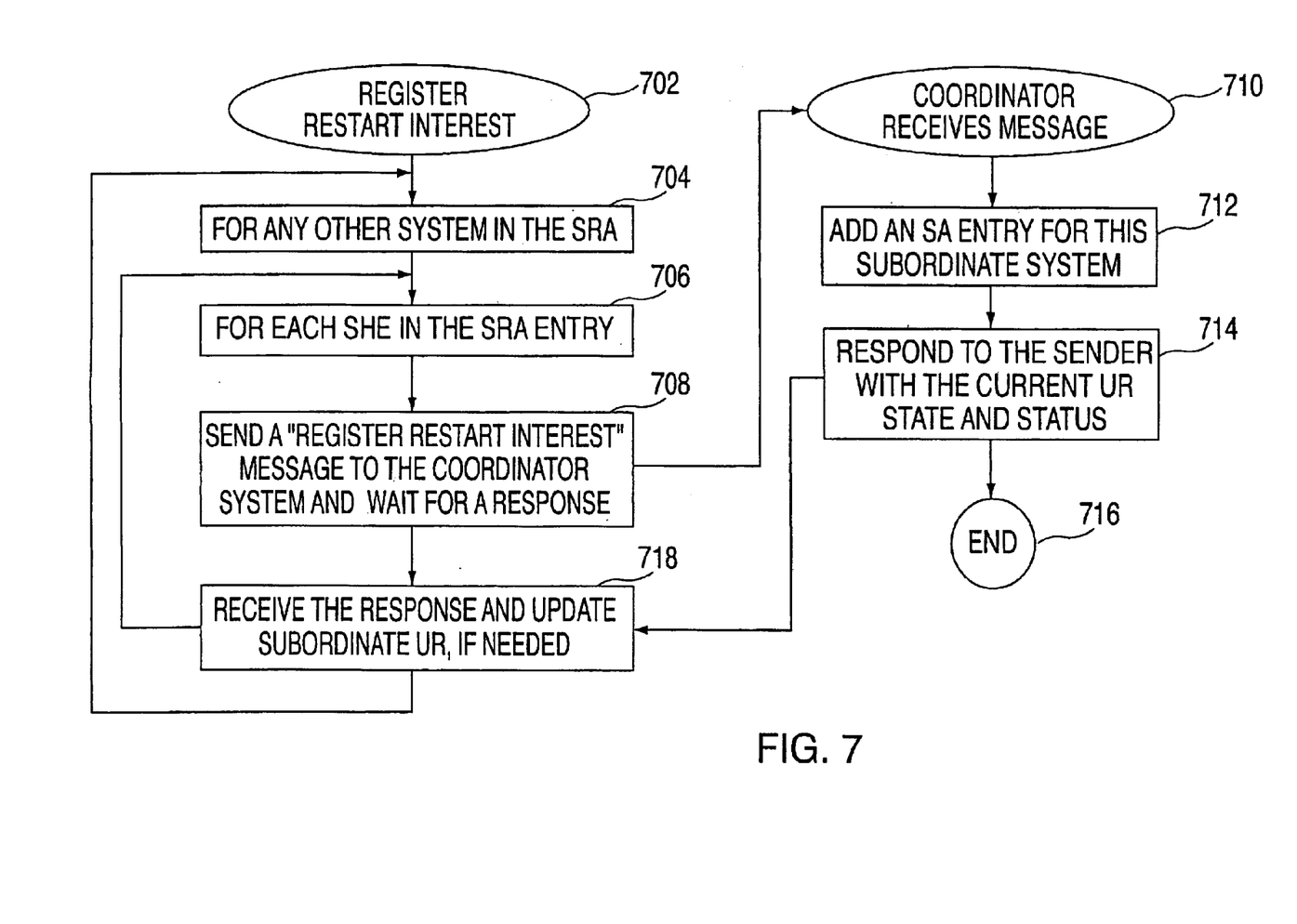
FIG. 7 is a flowchart of an exemplary register restart interest process.
Figure 8:
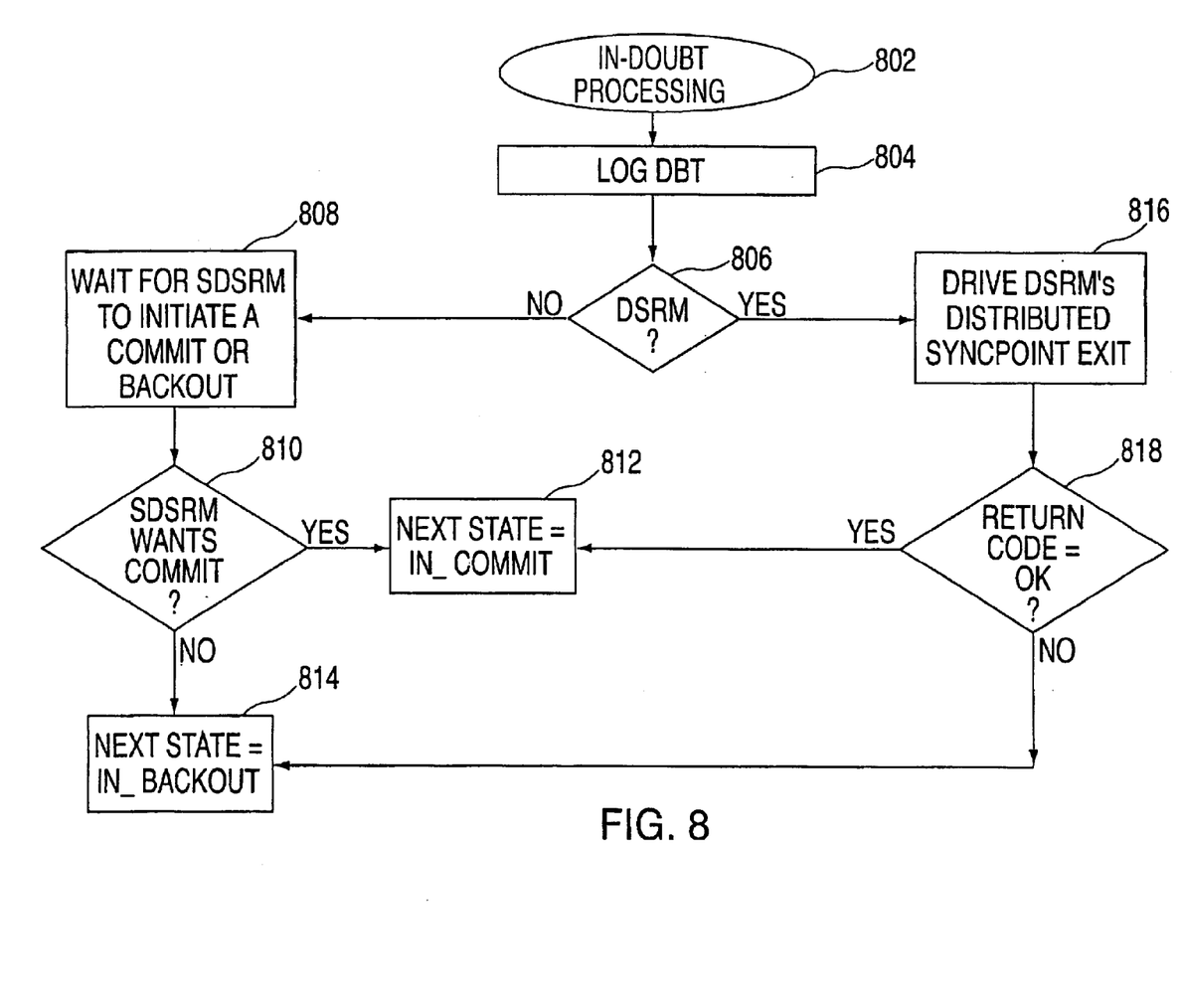
FIG. 8 is a flowchart of an exemplary syncpoint in-doubt phase process.
Figure 9:
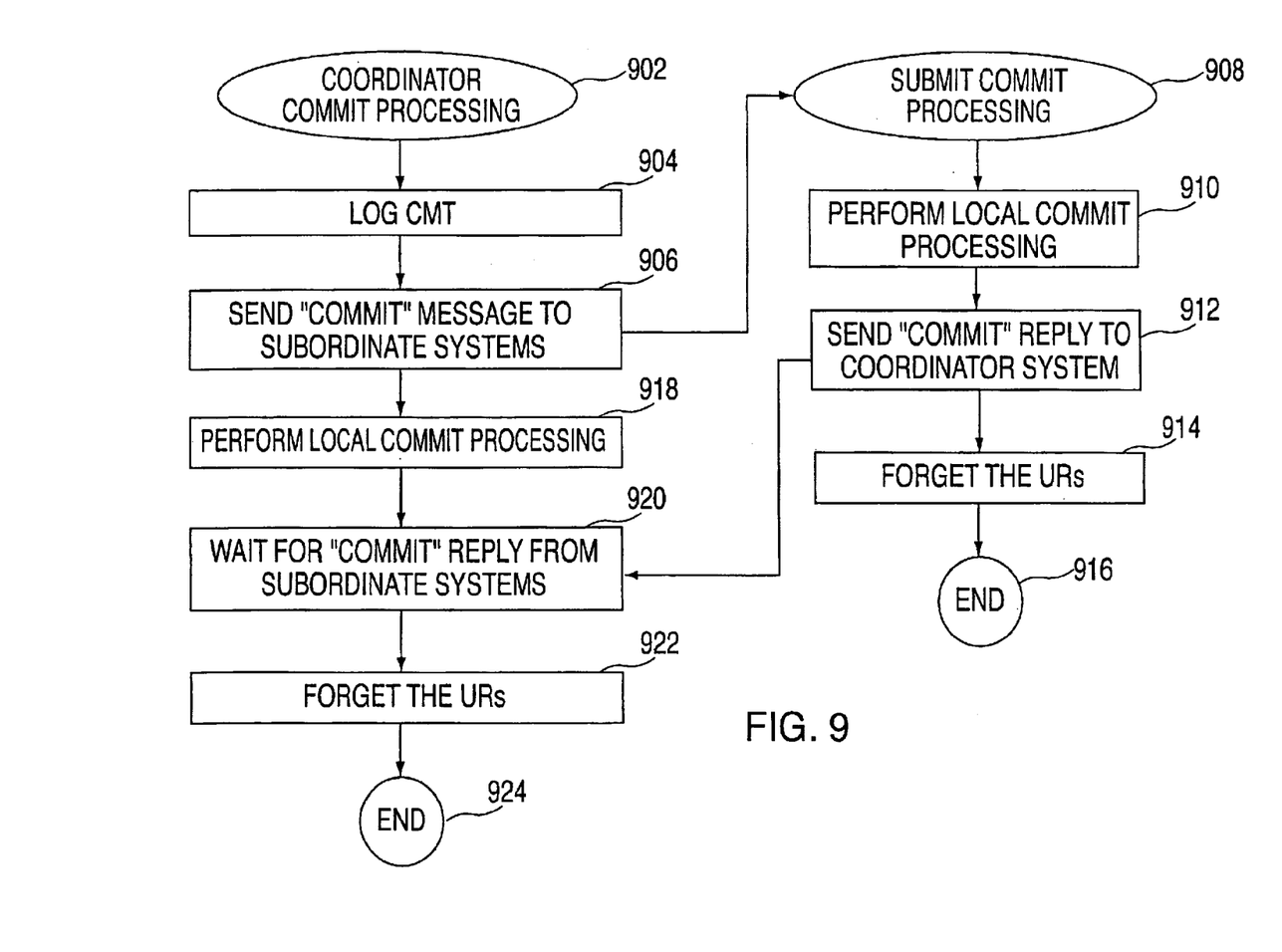
FIG. 9 is a flowchart of an exemplary syncpoint commit phase process.
Figure 10:
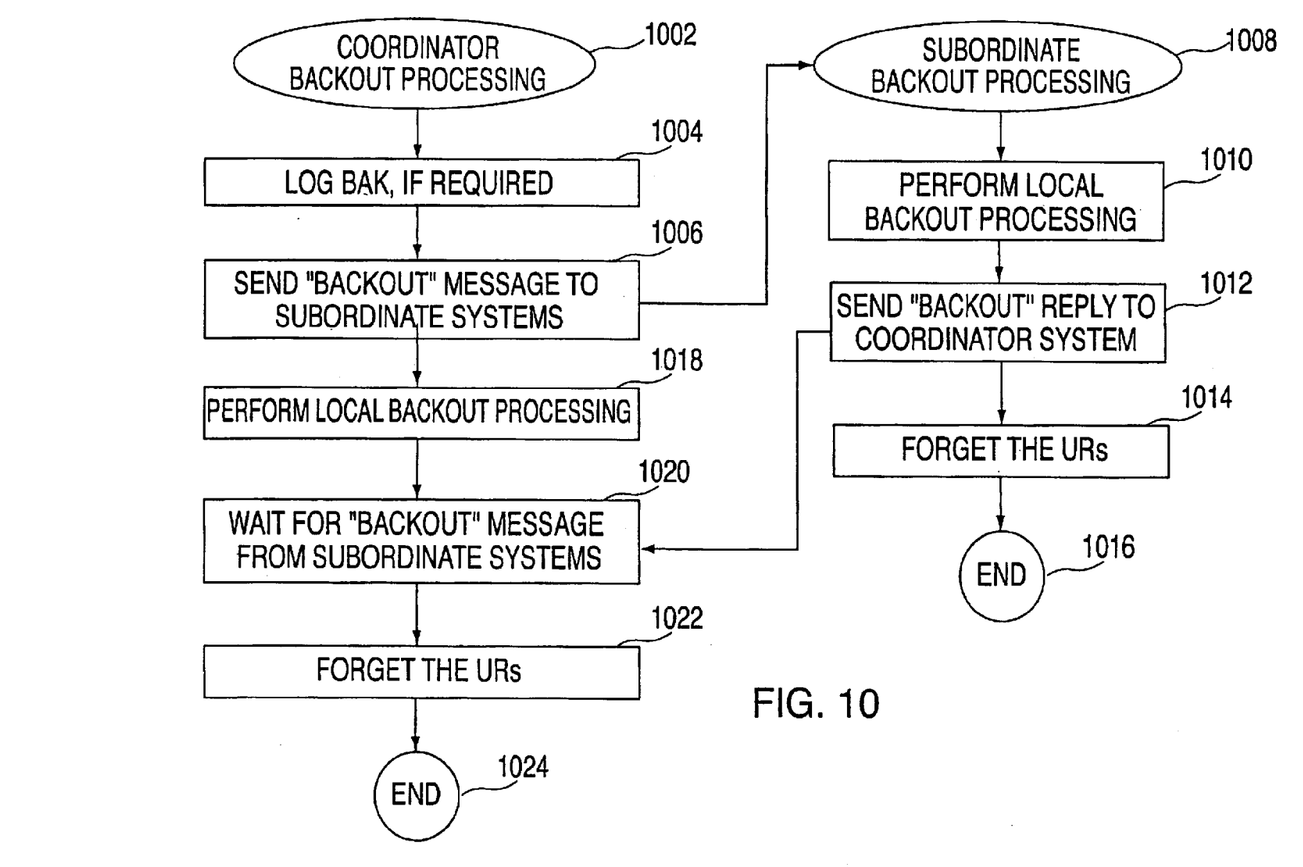
FIG. 10 is a flowchart of an exemplary syncpoint backout phase process.

FIGS. 3 through 7 depict an exemplary affinity-free restart process within a multi-system environment by using elements that include the common log 112, the sysplex cascade infrastructure depicted in FIG. 2, and the syncpoint process described in reference to FIGS. 8 through 10. In an exemplary embodiment, after a failure, as each resource manager involved in a particular transaction restarts, a new node in a distributed transaction is created by the resource manager upon which it restarts and this node is made part of a larger distributed transaction. This process essentially makes each individual resource manager's part of a transaction into a single node in a distributed transaction, rebuilding only the individual resource managers part of the transaction and finding all the other parts. This is in contrast to the current method in which a complete original node must be rebuilt on a single system. In an exemplary embodiment, the overall distributed transaction is then built by selecting one of the transaction managers to be the coordinator. The other transaction managers become agents. In an exemplary embodiment the coordinator is selected as follows:

1. If the coordinator system/transaction manager did not fail, the system remains the coordinator;
2. If the coordinator system/transaction manager fails and no server distributed syncpoint resource manager (SDSRM) or distributed syncpoint resource manager (DSRM) exists for a transaction; then the first resource manager that restarts after the failure causes the system with the transaction manager for the first resource manager to become the coordinator. SDSRMs and DSRMs are examples of distributed resource managers that could be used in an embodiment of the present invention.

3. If the coordinator system/transaction manager fails and a SDSRM or DSRM exist for a transaction then the system on which the SDSRM or DSRM restarts will become the coordinator.

4. The fourth case occurs when the coordinator system/transaction manager fails and the coordinator unit of recovery for an incomplete transaction has no log data. In this case one of the transaction managers in the sysplex will become the coordinator of that transaction. The transaction manager is selected based on which transaction manager first finds the transaction that meets this criteria. The transaction manager only becomes the coordinator if at least one resource manager involved in the transaction is active. If all the resource managers involved in the transaction are not active, the system on which the first resource manager involved in the transaction to restart will become the coordinator.

The transaction managers which are not the coordinator are known as subordinates. The coordinator determines the overall result of the transaction, communicate it to the subordinates and manage the log entries for the restarted transaction.

SDSRMs and DSRMs are examples of distributed resource managers that could be used in an embodiment of the present invention. A DSRM is a communications resource manager in a peer-to-peer distributed transaction model. A SDSRM is a communications resource manager in a client-server distributed transaction model. A communications resource manager controls access to distributed resources by allowing applications to communicate with other applications and resource managers. A communications resource manager also acts as an extension to the transaction manager by allowing a transaction manager to communicate with other transaction managers as needed to ensure coordination of the distributed resources accessed by the application.

In an exemplary embodiment, once the coordinator has been determined, resource managers restart and new nodes are created; then the nodes are added to the overall restarted distributed transaction. When the coordinator determines the outcome of the transaction, it informs the subordinates of this outcome. When a transaction manager is informed of the outcome it can allow its individual node to complete. When all of the nodes are completed, the coordinator can delete the transaction from the common log.

Figure 3:
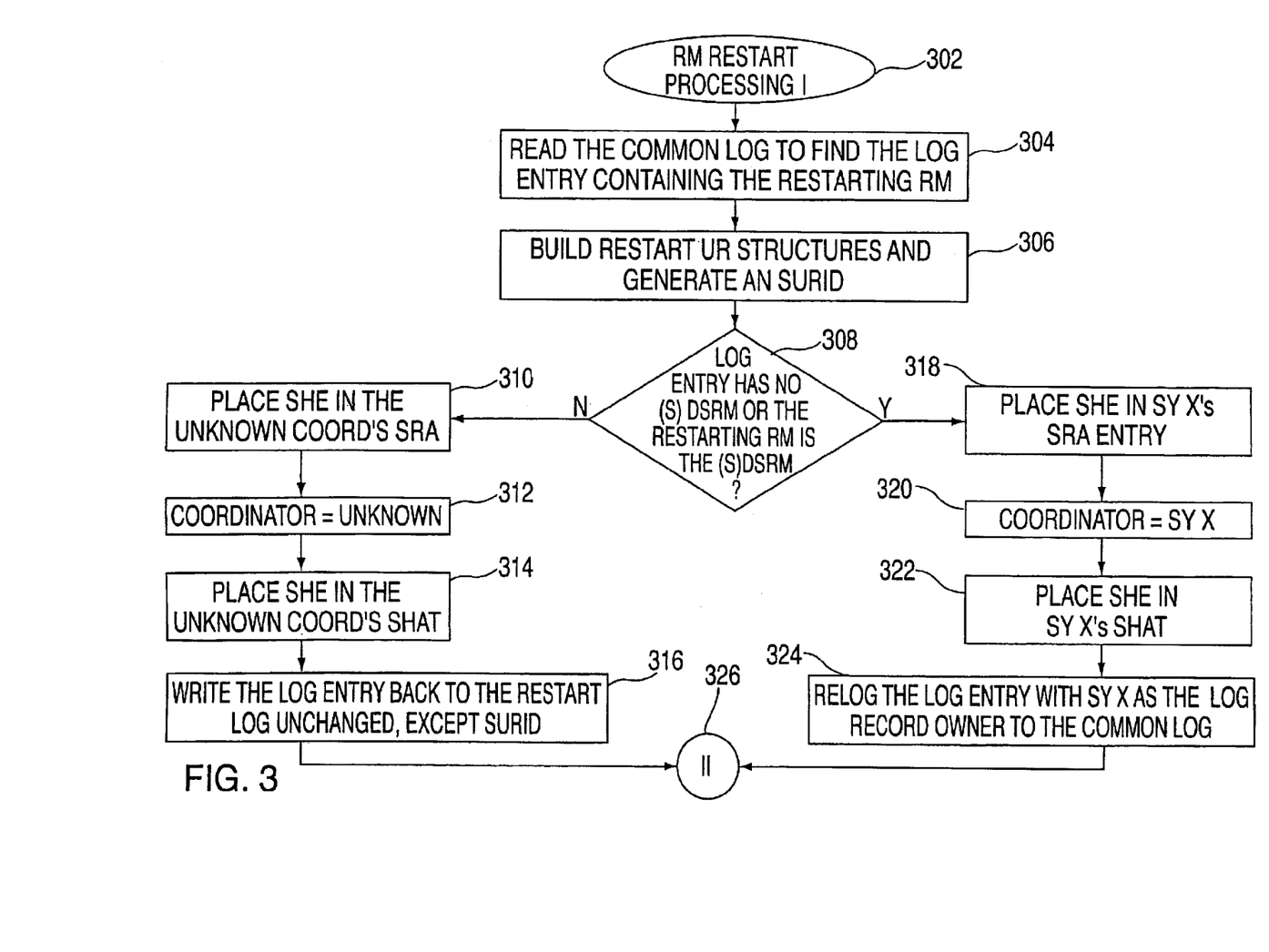
FIG. 3 is a flowchart of an exemplary first phase of a resource manager restart process.

FIG. 3 is a flowchart of an exemplary first phase of a resource manager restart process. Resource manager restarting process phase one is where the transaction manager is informed that a resource manager is restarting and the transaction manager finds those incomplete transactions where the coordinator has not yet restarted. This process is entered, at step 302, when a system or transaction manager has failed and resource manager restart is required. The process depicted in FIG. 3 is performed by the first resource manager to restart after the resource manager has called the transaction manager with a restart request. At step 304 the common log is read to find a log entry that contains the restarting resource manager. The common log keeps track of outstanding interests across a failure and is used to determine what outstanding transactions the restarting resource manager was involved in before the failure. Next, at step 306, the unit of recovery restart structures are built and a SURID 206 is generated if needed. The SURID 206 is generated only if a SURID 206 does not already exist for the transaction. In an exemplary embodiment, the unit of recovery restart structures include the unit of recovery (CD 212 and UR 210), the SHE 216, and the XUR 208. If a transaction already has a SURID 206, that SURID 206 will be retrieved from the log entry. The SURID 206 identifies the transaction unit of recovery and there is a unique SURID 206 generated for each separate transaction. The SURID 206 ties together all of the pieces of the transaction that must be committed as a unit or backed out as a unit.

Next, at step 308 in FIG. 3, the log entry is checked to see if it contains a resource manager that is designated SDSRM or DSRM and that therefore must be the coordinator resource manager. In FIG. 3, an exemplary embodiment, the restarting system associated with the resource manager is "SY X." If no resource manager is specified as the coordinator then step 318 is performed and the SHE 216 associated with the SURID 206 is placed in the sysplex restart array (SRA) entry for "SY X", the restarting system. The SRA is used during resource manager restart processing to associate each restart unit of recovery with the SURID 206 to which it is a member. Each entry in the SRA is a queue of SHEs 216, one array entry for each system in the sysplex and the SHE 216 that represents the SURE) 206 is queued to the SRA entry for the system on which the coordinator of its SURID 206 lives. If the coordinator is not yet active, the SRA has a "unknown coordinator SHE queue where the SHEs 216 are placed. The SRA is processed in FIG. 5. Next, at step 320, the coordinator system is set to "SY X", the restarting system. At step 322 the SHE 216 associated with the SURID 206 is placed in the SHAT 204 of "SY X", the restarting system. Finally, at step 324, the log entry containing the restarting resource manager (from step 304) is re-logged to the common log identifying "SY X", the restarting system, as the log record owner.

In an exemplary embodiment, step 310 is performed, if, as determined at step 308, the log entry contains a resource manager that is designated SDSRM or DSRM. At step 310, the SHE 216 is placed in the SRA of the unknown coordinator. Then at step 312, the coordinator system is set to "unknown" and processing continues with step 314 where the SHE 216 is placed in the SHAT 204 of the unknown coordinator. At step 316 the log entry read off of the common log in step 304 is written back to the common log unchanged but with the addition of the SURID 206 from step 306. The last step in this process is step 326 which begins the process depicted in FIG. 4.

Figure 4:
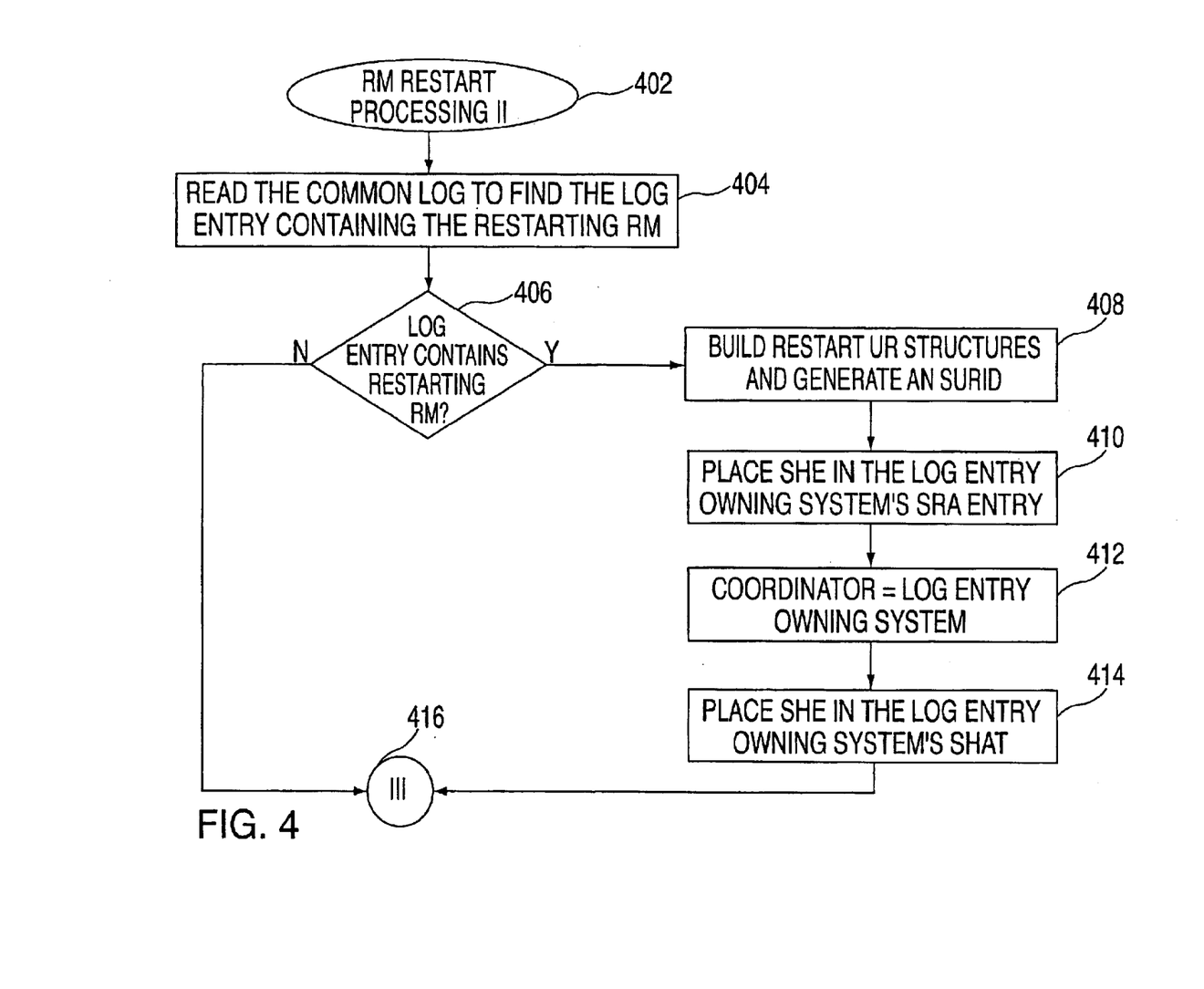
FIG. 4 is a flowchart of an exemplary second phase of a resource manager restart process.

FIG. 4 starts at step 402 and is a flowchart of an exemplary second phase of a resource manager restart process. Resource manager restart process phase two includes having the transaction manager find those incomplete transactions where the coordinator has restarted. In an exemplary embodiment, this process is initiated by a second or subsequent resource manager to restart and involves registering an interest with the coordinator system containing the first resource manager to restart. In step 404, the common log is read to find the log entry containing the restarting resource manager. Step 406 is used to determine if the log entry contains the restarting resource manager. If it does, step 408 is performed and the unit of recovery restart structures are built including the SURID 206 from the first resource manager to restart. At step 410, the SHE 216 is placed in the SRA entry of the system that owns the log record as written in step 324 in FIG. 3. Next, at step 412 the coordinator is set to the log entry owning system as written in step 324 in FIG. 3. Finally, in step 414, the SHE 216 is placed in the owning system SHAT 204. Processing then continues with step 416 which completes phase two and directs the process to phase three as depicted in FIG. 5.

Figure 5:
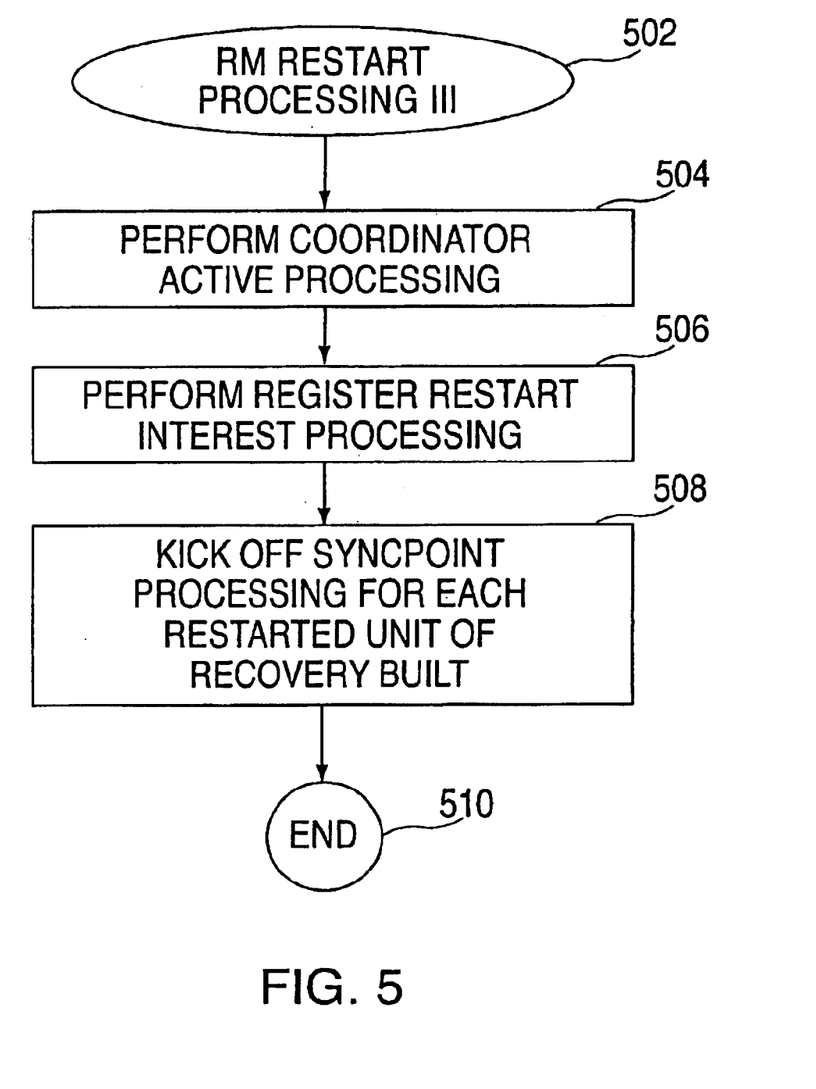
FIG. 5 is a flowchart of an exemplary third phase of a resource manager restart process.

FIG. 5 is a flowchart of an exemplary third phase of a resource manager restart process. In an exemplary embodiment, the resource manager restart process phase three includes having the transaction manager with which the restarting resource manager is restarting inform the other transaction managers in the sysplex that the coordinator units of recovery and/or subordinate units of recovery have been created and the other transaction managers may need to react. It starts with step 502, the entry point into the process. Step 504, perform coordinator active processing is performed as depicted in FIG. 6. It covers the case where the subordinate starts before the coordinator. Next, step 506, perform register restart interest processing, is performed as depicted in FIG. 7. Step 506 covers the case where the coordinator resource manager was restarted before the subordinate resource manager. At step 508 the syncpoint processing is initiated, and, depending on the restart state, the next processing performed will either be in-doubt phase processing as depicted in FIG. 8, commit phase processing as depicted in FIG. 9, or backout phase processing as depicted in FIG. 10 in order complete the restart of the transaction. The process in FIG. 5 ends at step 510.

FIG. 6 is a flowchart of an exemplary coordinator active process that gets performed, starting at step 602, when the subordinate resource manager restarts before the coordinator resource manager. Coordinator active processing includes having the transaction manager with which the restarting resource manager is restarting inform any other transaction managers, where a subordinate unit of recovery for a particular SURID 206 already exists, that the coordinator unit of recovery has been created. Step 604 creates a loop so that steps 606, 608, 610, and 612 are performed for each SHE 216, or transaction group, in the SRA on the coordinator resource manager system. In other words, these steps will be performed for each SURID 206 group on the coordinator system. Step 606 creates a loop so that steps 608, 610 and 612 are performed for each resource manager involved in the same transaction or SURID 206 group. A check is made at step 608 to see if the resource manager has already been restarted and if it has processing continues with step 610, otherwise processing continues with the next resource manager in step 606. If the resource manager is already active, step 610 is performed and an SA entry is created that registers the resource managers system with the coordinator system. Then, in step 612, a broadcast is made to the active resource manager system telling it that the name of the coordinator system from the SURID 206 group.

In an exemplary embodiment, processing continues at step 614 when the subordinate system receives the message from the coordinator system. First, in step 616, the subordinate system finds the SHE 216 for the SURID. Next, in step 618, the XUR on the subordinate system is updated to include the identity of the coordinator node. Finally, the SHE 216 for the SURID 206 is placed in the coordinator system SHAT 204 in step 620. Processing then ends at step 622.

FIG. 7 is a flowchart of an exemplary register restart interest process beginning at step 702. In an exemplary embodiment, register restart interest processing includes having the transaction manager, with which the restarting resource manager is restarting, inform the transaction manager, where the coordinator unit of recovery resides, for a particular SURID that a new subordinate unit of recovery has been created. Step 704 sets up a loop so that the processing described in FIG. 7 is performed for each subordinate system, identified by an entry in the SRA associated with the restarting SURID 206. Step 706 sets up another loop so that steps 708, 710, 77, 714 and 716 are performed for each SHE 215 in the SRA entry. At step 708, a message is sent to the coordinator to register a restart interest. The processing continues at step 710 on the coordinator system. At step 712 an SA entry for the subordinate system is created and at step 714 the coordinator responds to the sender with the current unit of recovery state and status. Coordinator processing is complete at step 716 and at 718 the subordinate system receives the response and updates the subordinate unit of recovery, if needed. Then the loop continues back up at step 704 for the next system listed in the SRA.

In an exemplary embodiment, the restart process described in this invention can be enabled by the use of a two-phase commit process as described below in reference to FIGS. 8 through 10. These Figures depict the syncpoint flows for a sysplex cascaded transaction. The two-phase commit process for a sysplex cascaded transaction can be accomplished by using messaging facilities to signal and receive the syncpoint flows between the coordinator and its subordinate systems. In an exemplary embodiment, phase one of the two phase commit process, involves checking to see if all updates are clear and phase two involves committing the updates and releasing the locks on resources. In the exemplary embodiment, in order to minimize messaging traffic overhead, a sysplex cacaded unit of recovery tree is only two levels deep, with the coordinator at one level and all of its subordinates at the next level.

FIG. 8 is a flowchart of an exemplary syncpoint in-doubt phase process. This process starts at step 802 and gets called when one of the resource managers has been designated a DSRM or SDSRM. A log entry is made at step 804. At step 806 a check is made to determine if the resource manager has been designated a DSRM. If it is a DSRM then step 816 is performed and the DSRM's distributed syncpoint exit is driven. The next state is set to "in-commit" at step 812 if the return code at step 818 is "ok." Processing then continues with the syncpoint commit phase process as depicted in FIG. 9. If the return code in step 818 was not "ok" the next state is set to "in-backout" at step 814 and processing continues with the syncpoint backout phase process as depicted in FIG. 10. Alternatively, if the resource manager is a SDSRM, as determined at step 806, then the process waits for the SDSRM to initiate a commit or backout at step 808. If the SDSRM requests a commit at step 810 then step 812 is performed and the next state is set to "in-commit." Processing then continues with the syncpoint commit phase process depicted in FIG. 9. If the SDSRM does not request a commit in step 810 then the next state is set to "in-backout" at step 814 and processing continues with the syncpoint backout phase process depicted in FIG. 10.

FIG. 9 is a flowchart of an exemplary syncpoint commit phase process. In an exemplary embodiment, syncpoint commit phase processing occurs when all the resource managers decided to commit their database changes during syncpoint prepare phase processing. The transactions manager directs the resource managers to apply their database changes. In an exemplary embodiment, local commit processing includes having the transaction manager drive the resource manager commit exits, requesting that the resource managers to apply their database changes. Processing begins at step 902 and a log entry is made at step 904. Next, at step 906, a message is sent, if needed, to the subordinate systems instructing them to commit the transaction associated with the SURID 206. The message is needed if the restart unit of recovery was created in the in-doubt stage. This starts the commit processing that begins at step 908 for each subordinate system. First, the subordinate system will perform local commit processing at step 910. Next, the subordinate system will send a commit reply to the coordinator system at step 912. Finally, at step 914, the subordinate system will complete the transaction by performing tasks such as removing the control blocks associated with the completed unit of recovery. Subordinate processing then ends at step 916. The coordinator system performs its own local commit processing at step 918 and then waits for commit replies to be received from the subordinate systems at step 920. Once the replies have been received the coordinator system completes the transaction at step 922 by performing clean up tasks that could include removing control blocks associated with the completed unit of recovery. Commit processing then ends at step 924.

FIG. 10 is a flowchart of an exemplary syncpoint backout phase process. In an exemplary embodiment, syncpoint backout phase processing occurs when at least one of the resource managers decided to backout their database changes during syncpoint prepare phase processing. The transaction manager directs the resource managers to undo their database changes. In an exemplary embodiment, local backout processing includes having the transaction manager drive the resource manager backout exits, requesting that the resource managers undo their database changes. Processing begins at step 1002 and a log entry, if required, is made at step 1004. Next, at step 1006, a message is sent, if needed, to the subordinate systems instructing them to back out the transaction associated with the SURID 206. The message is needed if the restart unit of recovery was created in the in-doubt stage. This starts the backout processing that begins at step 1008 for each subordinate system. First, the subordinate system will perform local backout processing at step 1010. Next, the subordinate system will send a backout reply to the coordinator system at step 1012. Finally, at step 1014, the subordinate system will complete the transaction by performing tasks such as removing the control blocks associated with the completed unit of recovery. Subordinate processing then ends at step 1016. The coordinator system performs its own local backout processing at step 1018 and then waits for backout replies to be received from the subordinate systems at step 1020. Once the replies have been received the coordinator system completes the transaction at step 1022 by performing clean up tasks that could include removing control blocks associated with the completed unit of recovery. Backout processing then ends at step 1024.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiments for carrying out this invention, but that the invention will include all embodiments falling within the scope of the appended claims.

What is claimed is:

1. A method for affinity free restart of a resource manager in a multi-system environment, said method comprising:

receiving a restart request from a first resource manager on a first system in said multi-system environment, wherein said first resource manager is associated with an incomplete transaction;

building a distributed transaction unit of recovery structure for said incomplete transaction; and sending said distributed transaction unit of recovery structure to a transaction manager for restart processing; said restart processing comprising:

restarting said first resource manager on said first system; and restarting a second resource manager on a second system in the multi-system environment if said incomplete transaction is associated with said second resource manager, said second system being different from said first system, and said second resource manager previously having a node in common with said first resource manager;

wherein said distributed transaction unit of recovery structure comprises:

an index to locate an individual unit of recovery block associated with said incomplete transaction;

a subordinate array that includes an entry for at least one system in the multi-system environment that will take part in the restart of said incomplete transaction.

2. The method of claim 1 wherein said distributed transaction unit of recovery structure further comprises:

a unique identifier for said incomplete transaction.

3. The method of claim 2 wherein said building a distributed transaction unit of recovery structure for said incomplete transaction comprises:

creating said individual unit of recovery block associated with said first resource manager and said incomplete transaction;

designating a coordinator node;

broadcasting from said coordinator said unique identifier for said incomplete transaction across the multi-system environment requesting notification of interest in said incomplete transaction;

recording said notification of interest from a subordinate node in said incomplete transaction in said subordinate array.

4. The method of claim 3 wherein said designating a coordinator node comprises:

assigning a status of coordinator node to said first resource manager;

checking to see if a resource manager other than said first resource manager has been designated said status of coordinator node; and changing said status of said first resource manager to said subordinate node if said resource manager other than said first resource manager has been designated said coordinator node.

5. The method of claim 1 wherein said resource manager is a relational database management system.

6. The method of claim 1 wherein said resource manager is a hierarchical database management system.

7. The method of claim 1 wherein said transaction manager is a distributed syncpoint manager.

8. The method of claim 1 wherein said restart processing is performed using a two phase commit process.

9. The method of claim 1 wherein said multi-system environment includes a common log.

10. A method for affinity free restart of a resource manager in multi-system environment, said method comprising:

receiving a restart request from a first resource manager on a first system in said multi-system environment, wherein said first resource manager is associated with an incomplete transaction;

building a distributed transaction unit of recovery structure for said incomplete transaction; and sending said distributed transaction unit of recovery structure to a transaction manager for restart processing; said processing comprising:

restarting said first resource manager on said first system; and restarting a second resource manager on a second system in the multi-system environment if said incomplete transaction is associate with said second resource manager, said second system being different from said first system, and said second resource manager previously having a node in common with said first resource manager;

wherein said distributed transaction unit of recovery structure is a sysplex cascaded unit of recovery family.

11. A system for affinity free restart of a resource manager in a multi-system environment, said multi-system environment comprising a computer processor, said computer processor implementing a method comprising:

receiving a restart request from a first resource manager on a first system in said multi-system environment, wherein said first resource manager is associated with an incomplete transaction;

building a distributed transaction unit of recovery structure for said incomplete transaction; and sending said distributed transaction unit of recovery structure to a transaction manager for restart processing; said restart processing comprising:

restarting said first resource manager on said first system; and restarting a second resource manager on a second system in the multi-system environment if said incomplete transaction is associated with said second resource manager, said second system being different from said first system, and said second resource manager previously having a node in common with said first resource manager;

wherein said distributed transaction unit of recovery structure comprises:

an index to locate an individual unit of recovery block associated with said incomplete transaction;

a subordinate array that includes an entry for at least one system in the multi-system environment that will take past in the restart of said incomplete transaction.

12. The system of claim 11 wherein said distributed transaction unit of recovery structure further comprises:

a unique identifier for said incomplete transaction.

13. The system of claim 12 wherein said building a distributed transaction unit of recovery structure for said incomplete transaction comprises:

creating said individual unit of recovery block associated with said first resource manager and said incomplete transaction;

designating a coordinator node;

broadcasting from said coordinator said unique identifier for said incomplete transaction cross the multi-system environment requesting notification of interest in said incomplete transaction;

recording said notification of interest from a subordinate node in said incomplete transaction in said subordinate array.

14. The system of claim 13 wherein said designating a coordinator node comprises:

assigning a status of coordinator node to said first resource manager;

checking to see if a resource manager other than said first resource manager has been designated said status of coordinator node; and changing said status of said first resource manager to said subordinate node if said resource manager other than said first resource manager has been designated said coordinator node.

15. The system of claim 11 wherein said resource manager is a relational database management system.

16. The system of claim 11 wherein said resource manager is a hierarchical database management system.

17. The system of claim 11 wherein said transaction manager is a distributed syncpoint manager.

18. The system of claim 11 wherein said restart processing is performed using a two phase commit process.

19. The system of claim 11 wherein said multi-system environment includes a common log.

20. A system for affinity free restart of a resource manager in a multi-system environment, said multi-system environment comprising a computer processor, said computer processor implementing a method comprising:

receiving a restart request from a first resource manager on a first system in said multi-system environment, wherein said first resource manager is associated with an incomplete transaction;

building a distributed transaction unit of recovery structure for said incomplete transaction; and sending said distributed transaction unit of recovery structure to a transaction manager for restart processing; said restart processing comprising:

restarting said first resource manager on said first system; and restarting a second resource manager system on a second system in the multi-system environment if said incomplete transaction is associated with said second resource manager, said second system being different from said first system, and said second resource manager previously having a node in common with said first resource manager;

wherein said distributed transaction unit of recovery structure is a sysplex cascaded unit of recovery family.

21. A storage medium encoded with machine-readable computer program code for affinity free restart of a resource manager in a multi-system environment, the storage medium storing instructions for causing an affinity free restart system to implement a method comprising:

receiving a restart request from a first resource manager on a first system in said multi-system environment, wherein said first resource manager is associated with an incomplete transaction;

building a distributed transaction unit of recovery structure for said incomplete transaction; and sending said distributed transaction unit of recovery structure to a transaction manager for restart processing; said restart processing comprising:

restarting said first resource manager on said first system; and restarting a second resource manager on a second system in the multi-system environment if said incomplete transaction is associated with said second resource manager, said second system being different from said first system, and said second resource manager previously having a node in common with said first resource manager;

wherein said distributed transaction unit of recovery structure comprises:

an index to locate an individual unit of recovery block associated with said incomplete transaction;

a subordinate array that includes an entry for at least one system in the multi-system environment that will take part in the restart of said incomplete transaction.

22. The storage medium of claim 21 wherein said distributed transaction unit of recovery structure further comprises:

a unique identifier for said incomplete transaction.

23. The storage medium of claim 22 wherein said building a distributed transaction unit of recovery structure for said incomplete transaction comprises:

creating said individual unit of recovery block associated with said first resource manager and said incomplete transaction;

designating a coordinator node;

broadcasting from said coordinator said unique identifier for said incomplete transaction across the multi-system environment requesting notification of interest in said incomplete transaction;

recording said notification of interest from a subordinate node in said incomplete transaction in said subordinate array.

24. The storage medium of claim 23 wherein said designating a coordinator node comprises:

assigning a status of coordinator node to said first resource manager;

checking to see if a resource manager other than said first resource manager has been designated said status of coordinator node; and changing said status of said first resource manager to said subordinate node if said resource manager other than said first resource manager has been designated said coordinator node.

25. The storage medium of claim 21 wherein said resource manager is a relational database management system.

26. The storage medium of claim 21 wherein said resource manager is a hierarchical database management system.

27. The storage medium of claim 21 wherein said transaction manager is a distributed syncpoint manager.

28. The storage medium of claim 21 wherein said restart processing is performed using a two phase commit process.

29. The storage medium of claim 21 wherein said multi-system environment includes a common log.

30. A storage medium encoded with machine-readable computer program code for a affinity free restart of a resource manager in a multi-system environment the storage medium storing instructions for causing an affinity free restart system to implement a method comprising:

receiving a restart request from a first resource manager on a first system in said multi-system environment, wherein said first resource manager is associated with an incomplete transaction;

building a distributed unit transaction unit of recovery structure for said incomplete transaction; and sending said distributed transaction unit of recovery structure to a transaction manager for restart processing; said restart processing comprising:

restarting said first resource manager on said first system; and restarting a second resource manager on a second system in the multi-system environment if said incomplete transaction is associated with said second resource manager, said second system being different from said first system, and said second resource manager previously having a node in common with said first resource manager;

wherein said distributed transaction unit of recovery structure is a sysplex cascaded unit of recovery family.

* * * * *